United States Patent [19]
Smits et al.

[11] Patent Number: 5,754,050
[45] Date of Patent: May 19, 1998

[54] METHOD AND APPARATUS FOR MEASURING GEOMETRICAL CHARACTERISTICS OF A WELL, IN PARTICULAR A HYDROCARBON WELL

[75] Inventors: Jan W. Smits, Paris; Jean Claude Trouiller, Saint Remy Les Chevreuse, both of France

[73] Assignee: Schlumberger Technology Corporation, Ridgefield, Conn.

[21] Appl. No.: 733,574

[22] Filed: Oct. 18, 1996

[30] Foreign Application Priority Data

Oct. 20, 1995 [FR] France .................. 95 12347

[51] Int. Cl.$^6$ .................................................. G01V 3/24
[52] U.S. Cl. ............................................ 324/366; 324/371
[58] Field of Search ................................... 324/355, 366, 324/371, 373, 375

[56] References Cited

U.S. PATENT DOCUMENTS 5,396,175  3/1995  Seeman ................... 324/373 X

FOREIGN PATENT DOCUMENTS 0 544 584  6/1993  European Pat. Off. ......... G01V 3/24
0 522 088  7/1993  European Pat. Off. ......... G01V 3/20
0 556 114  8/1993  European Pat. Off. ......... G01V 3/24

OTHER PUBLICATIONS

J. Suau et al., "The Dual Laterolog-$R_{xo}$ Tool" published in 47th Annual Technical Conference and Exhibition, Society of Petroleum Engineers, SPE 4018, 1972, American Institute of Mining, Metallurgical and Petroleum Engineers Inc.

Primary Examiner—Gerard R. Strecker
Attorney, Agent, or Firm—Keith G. W. Smith

[57] ABSTRACT

A method and apparatus for evaluating the geometrical characteristics of a well, comprising insertion of a sonde (12) of elongate shape into the well, the sonde including azimuth electrodes ($A_{azi}$), an annular current electrode ($A_0$), and at least one annular current return electrode (A). The annular current electrode ($A_0$) emits a current $I_0$, which flows essentially in a column of mud situated inside the well and returns to the annular current return electrodes. Signals induced in response to the current $I_0$ are measured by the azimuth electrodes from which can be determined the geometrical characteristics of the well. An alternative embodiment includes an apparatus which is symmetrical about the azimuth electrodes.

19 Claims, 5 Drawing Sheets

METHOD AND APPARATUS FOR MEASURING GEOMETRICAL CHARACTERISTICS OF A WELL, IN PARTICULAR A HYDROCARBON WELL

BACKGROUND OF THE INVENTION

Technical Field and Prior Art

The present invention relates to the field of measurement tools, e.g. capable of being used in equipment for oil prospecting and production.

More specifically, after a well has been bored, this type of activity requires sondes or sensors, in particular electrical or electromagnetic sondes or sensors, to be inserted therein to perform measurements serving, amongst other things, to characterize the fluids present in the ground and layers around the borehole, and also the dip of said layers. The term "logging" is used to designate any continuous recording as a function of depth of variations in a given characteristic of the formations surrounding a borehole.

An example of equipment for providing such a log on the basis of measuring the resistivity of the surrounding formations is described in an article by J. Suau et al., entitled "The dual laterolog-$R_{x_o}$ tool" published in the 47th Annual Technical Conference and Exhibition, Society of Petroleum Engineers, SPE 4018, 1972, American Institute of Mining, Metallurgical, and Petroleum Engineers Inc.

The equipment described in that article essentially comprises a sonde having an elongate body with analog electrodes for injecting current being distributed longitudinally along the body of the sonde. Focusing electrodes, current return electrodes, and voltage measuring electrodes are also provided along the body of the sonde.

Another logging apparatus, likewise operating by injecting current into the zones around the sonde, is described in document EP-A-556 114. The tool described in that document serves not only to obtain information on the resistivity of the surrounding layers, but also to obtain information on the geometrical characteristics (section, shape, eccentricity) of the borehole along which the tool is travelling. This second type of information may be of interest in itself, or it may be useful in correcting measurements concerning the formations themselves, in particular resistivity measurements.

The structure of a tool described in that document and its method of operation are briefly recalled with reference to FIG. 1. In this figure, reference 2 designates a section of the sonde that carries an annular current electrode 3, an annular potential-measurement electrode 4, and an array of azimuth electrodes disposed around the circumference of the body of the sonde. Each azimuth electrode is in fact subdivided into a current azimuth electrode $5_{ai}$ and a potential-measurement azimuth electrode $6_{ai}$, surrounded thereby (i=1,12). The array of azimuth electrodes is longitudinally offset from the annular current electrode 3 and from the annular potential electrode 4. A current $I_i$ can be emitted from the azimuth current electrode $5_{ai}$ to the annular electrode 3, with this current flowing essentially in a column of mud situated inside the well. In order to measure the distance between the surface of the sonde and the wall of the well in a plurality of directions around the sonde, a plurality of currents $I_i$ coming from the various electrodes $5_{ai}$ are emitted towards the electrode 3. The potential differences $V_i$ are measured between the potential-measurement electrode 4 and the potential-measurement azimuth electrodes $6_{ai}$. The apparent resistivity $R_i$ of the zone conveying each of the currents $I_i$ is given by the following equation:

$$R_i = \frac{K \times \Delta V_i}{I_i}$$

where K is a constant that depends on the shape of the sonde. Each apparent resistivity $R_i$ is a function of the radial distance between the electrode $5_{ai}$ and the wall of the borehole situated facing said electrode $5_{ai}$. Thus, information concerning this distance $d_i$ is obtained from signals representing the apparent resistivities $R_i$. It is possible to deduce therefrom a measure of the eccentricity of the sonde within the hole.

That document also describes a second apparatus, of the "dual laterolog" type, enabling the resistivity of the surrounding formations to be measured simultaneously with the eccentricity of the sonde within the hole, on the basis of distance measurements between the tool and the wall of the hole. The second measurement is performed using currents at a second frequency $f_2$ in application of the principle described above with reference to the tool of FIG. 1.

In a variant, it is possible in both apparatuses to maintain all of the currents $I_i$ at the same value, thereby making it possible to obtain a simplified equation:

$$R_i = \frac{K \times V_i}{I}$$

Thus, those apparatuses and methods require either as many currents $I_i$ to be injected as there are azimuth electrodes in operation, or else means for injecting the same current from each of the various azimuth electrodes.

In addition, the result obtained depends on the resistivity $R_M$ of the column of mud present in the borehole.

Finally, the method implemented requires both voltages and currents to be measured simultaneously.

SUMMARY OF THE INVENTION

An object of the invention is to propose a novel method and novel apparatus making it possible to obtain information concerning the geometrical characteristics of a well, in particular a hydrocarbon well.

The method and the apparatus should, in particular, make it possible to measure a plurality of radial distances between the body of a sonde provided with current injection electrodes and the wall of a borehole.

In particular, the apparatus and the method should be independent of azimuth dependency on the injected currents $I_i$ or of the need to maintain these various currents at the same value.

In a first aspect, the invention provides a method of measuring the geometrical characteristics of a well, the method comprising:

inserting a sonde of elongate shape into the well, the sonde including an array of N azimuth electrodes disposed around a circumference of the body of the sonde, an annular current electrode longitudinally separated from the array of azimuth electrodes, and at least one annular current return electrode longitudinally offset from the annular current electrode and from the array of azimuth electrodes, the annular electrodes being towards the same end of the sonde relative to the azimuth electrodes;

emitting a current $I_0$ via the annular current electrodes, said current $I_0$ flowing essentially in the column of mud situated inside the well; and producing signals in response to the emission of the current $I_0$, said signals being representative of the distances ($d_i$) between the body of the sonde and the wall of the well, in a plurality of directions around the sonde.

This method merely injects a current $I_0$ between an annular current electrode and an annular current return electrode, thus becoming independent of any need to inject different currents $I_i$ from the azimuth electrodes, or any need to maintain different currents Ii at the same value.

In a particular implementation, the method as described above further includes:

measuring a signal representative of a first voltage $\Delta V_{azi}$ between a first annular potential-measurement electrode and some of the azimuth electrodes corresponding to directions in which the distances between the body of the sonde and the wall of the well are to be measured; and measuring a signal representative of a voltage $\Delta V_M$ between said first potential-measurement electrode and a second annular potential-measurement electrode.

In this particular implementation, the measurement performed makes use of the measured values of $\Delta V_{azi}$ and $\Delta V_M$ whose ratio is independent of the resistivity of the mud $R_M$. In addition, only voltages are measured, which is more convenient than measuring voltages and currents simultaneously.

In another particular implementation of the invention, one of the annular potential-measurement electrodes lies inside the first annular current electrode. This makes it possible to improve measurement if the contact impedance at the surface of the annular current electrode is non-uniform.

For reasons of compatibility with other tools used in borehole logging, the sonde may advantageously include two annular current return electrodes that are maintained at the same potential.

The invention also provides apparatus for implementing a method as described above, the apparatus comprising:

a sonde of elongate shape including an array of N azimuth electrodes disposed around a circumference of the body of the sonde, an annular current electrode longitudinally offset from the array of azimuth electrodes, and at least one annular current return electrode longitudinally offset from the annular current electrode and from the array of azimuth electrodes, both annular electrodes lying towards the same end of the sonde relative to the azimuth electrodes;

means for emitting a current $I_0$ via the annular current electrode; and means for producing signals in response to emission of the current $I_0$, said signals being representative of distances ($d_i$) between the body of the sonde and the wall of the well in a plurality of directions around the sonde.

Advantageously, the apparatus further includes:

means for measuring a signal representative of a voltage $\Delta V_{azi}$ between a first annular potential-measurement electrode and certain azimuth electrodes; and means for measuring a signal representative of a voltage $\Delta V_M$ between said first potential-measurement electrode and a second annular potential-measurement electrode.

The method also provides a method of measuring the geometrical characteristics of a well, the method comprising:

inserting a sonde of elongate shape into the well, the sonde including an array of N azimuth electrodes disposed around a circumference of the sonde body, first and second annular current electrodes disposed on either side of the array of azimuth electrodes and longitudinally offset from said array, and at least first and second annular current return electrodes disposed on either side of the array of azimuth electrodes and longitudinally offset both from said array and from the first and second annular current electrodes, respectively;

emitting a first current $I_0$ from the first annular current electrode, said current $I_0$ flowing essentially in a column of mud situated inside the well;

emitting a second current $I_0$ via the second annular current electrode, said current $I_0$ flowing essentially in said column of mud situated inside the well; and producing a signal in response to the emission of the currents $I_0$ and $I_0$, said signal being representative of the distance ($d_i$) between the sonde body and the wall of the well in a plurality of directions around the sonde.

This method makes it possible to measure a plurality of distances between the sonde body and the wall of the borehole situated facing the azimuth electrodes. In addition, the currents are injected from annular current electrodes, thereby making it possible to avoid injecting a plurality of currents from the azimuth electrodes, and also making it possible to avoid maintaining the currents emitted by the various azimuth electrodes at an equal value.

In a particular implementation, the method further includes:

measuring a signal representative of a first voltage $\Delta V_{azi}$ between a first annular potential-measurement electrode and some azimuth electrodes, corresponding to directions in which the distance between the sonde body and the well wall is to be measured; and measuring a signal representative of a second voltage $\Delta V_m$ between said first potential-measurement electrode and a second annular potential-measurement electrode, said two electrodes being situated towards the same end of the sonde relative to the azimuth electrodes;

measuring a signal representative of a third voltage $\Delta V'_{azi}$ between a third annular potential-measurement electrode and some azimuth electrodes corresponding to directions in which the distance between the sonde body and the well wall is to be measured; and measuring a signal representative of a fourth voltage $\Delta V'_M$ between said third potential-measurement electrode and a fourth annular potential-measurement electrode, which two electrodes are situated relative to the azimuth electrodes towards the end of the sonde opposite to the end on which the first and second annular potential-measurement electrodes are situated.

In this particular implementation, only voltages need to be measured and there is thus no need to measure voltages and currents simultaneously. In addition, the measurement is obtained from the ratio $(\Delta V_{azi}+\Delta V'_{azi})/(\Delta V_M+\Delta V'_M)$ and is thus independent of the resistivity of the mud $R_M$.

As for the first method of the invention, already described above, and with the same advantages, one of the first and second potential-measurement electrodes may be found within the first annular current electrode (the same applying to the third and fourth potential-measurement electrodes and the second annular current electrode).

For reasons of compatibility with other tools or other measurements to be performed simultaneously, the sonde may include two first annular current return electrodes and/or two second annular current return electrodes that are maintained at the same potential.

The invention also provides apparatus for implementing the second method of the invention, said apparatus comprising:

a sonde of elongate shape including an array of N azimuth electrodes disposed around a circumference of the body of the sonde, first and second annular current electrodes disposed on either side of the array of azimuth electrodes and longitudinally offset from said array, and at least first and second annular current return electrodes disposed on either side of the array of azimuth electrodes and longitudinal offset from said array and also from the first and second annular current electrodes respectively;

means for emitting a first current $I_0$ via the first annular current electrode;

means for emitting a second current $I_0$ via the second annular current electrode; and means for producing a signal in response to the emission of the currents $I_0$ and $I_0$, said signal being representative of distances ($d_i$) between the body of the sonde and the wall of the well, in a plurality of directions around the sonde.

BRIEF DESCRIPTION OF THE FIGURES

In any event, the characteristics and advantages of the invention appear more clearly in the light of the following description which relates to embodiments given by way of non-limiting explanation, and which refers to the accompanying drawings, in which.

DETAILED DESCRIPTION OF EMBODIMENTS

Figure 2:
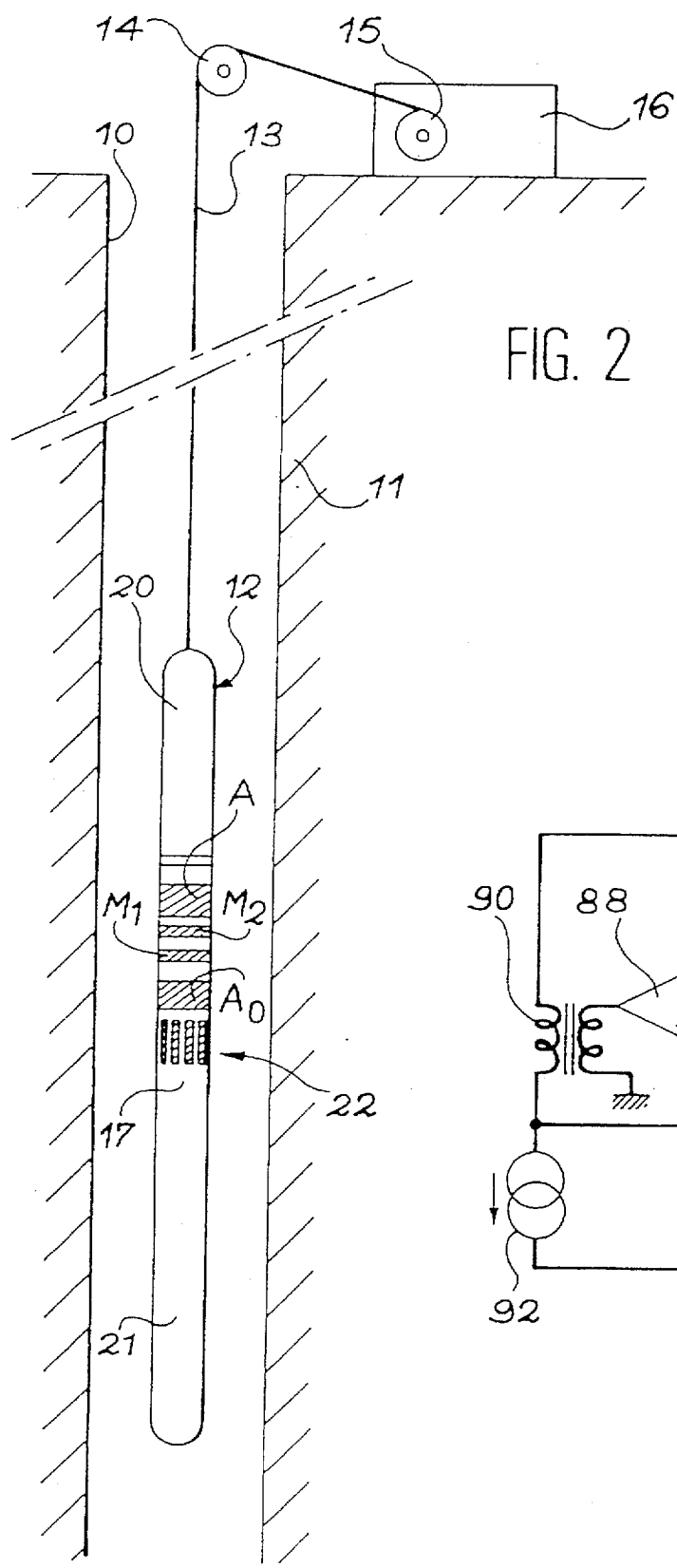
FIG. 2 shows logging equipment comprising a sonde, on which electrodes are disposed enabling the geometrical characteristics of a well to be measured in accordance with the invention.

Overall implementation of the invention is initially shown diagrammatically in FIG. 2 where there can be seen logging equipment enabling the characteristics of ground formations 11 around a borehole or well 10 to be determined. The equipment comprises a sonde 12 which is suspended in the borehole at the end of a multiconductor cable 13. The cable 13 passes over a sheave 14 and is wound onto a drum 15 which enables the sonde 12 to be moved along the borehole. The drum 15 forms a part of a surface unit 16 which may also include computer means for processing the data measured by the sonde as it moves along the borehole.

The sonde 12 is elongate in shape. It comprises a body 17 having a top portion 20 including a closed metal case in which electrical circuits are located, and a bottom section 21 in which formation-measuring apparatuses may be integrated. By way of example, such measurement apparatuses may be electrodes, induction coils, nuclear or acoustic apparatuses, or any other type of measurement apparatus. In addition, the section 21 includes an array 22 of electrodes enabling the geometrical characteristics of the borehole to be determined.

Figure 1:
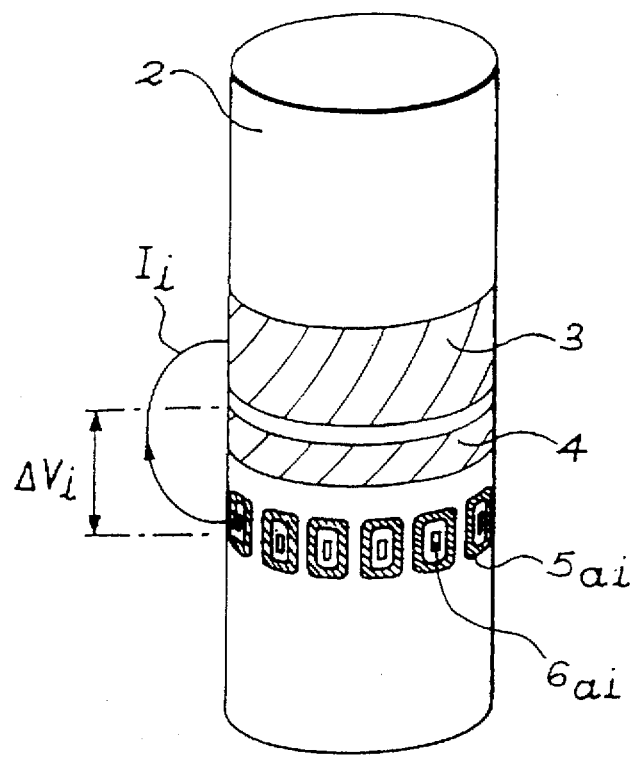
FIG. 1 is a diagram of prior art apparatus.
Figure 3:
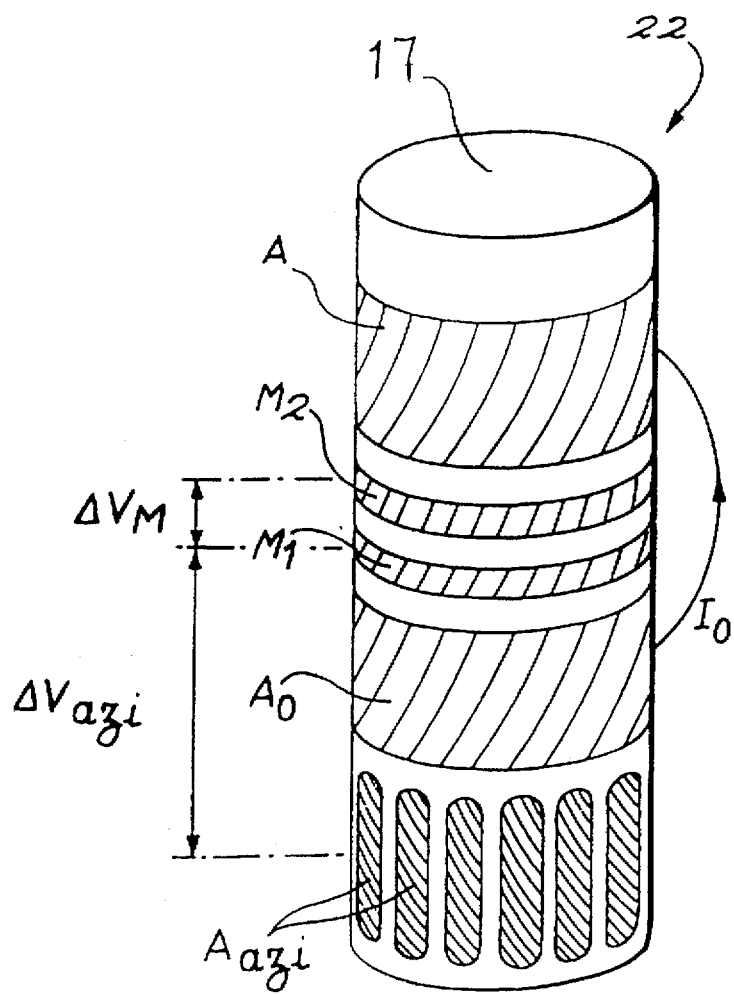
FIG. 3 shows an embodiment of apparatus of the present invention.

Such an array 22 of electrodes is now described with reference to FIG. 3. In this figure, an array of azimuth electrodes $A_{azi}$ is disposed around a circumference of the body 17 of the sonde. There are N of these electrodes where $1 \leq i \leq N$. N is preferably chosen to be equal to 12. In addition, these electrodes are preferably distributed uniformly around the circumference. An annular current electrode $A_0$ is longitudinally offset from the array of azimuth electrodes. A second annular electrode A is longitudinally offset from the array of azimuth electrodes and from the first annular electrode $A_0$. This second annular electrode constitutes a current return electrode.

In order to perform a measurement of the geometrical characteristics of the borehole, a current $I_0$ is emitted by the annular current electrode $A_0$ and the current flows essentially in a column of mud situated inside the well.

Potential-measurement electrodes $M_1$ and $M_2$ may also be provided. By way of example, they are situated between the annular electrodes $A_0$ and A. Because of the current $I_0$ emitted by the annular electrode $A_0$, a potential difference $\Delta V_{azi}$ is established between each azimuth electrode $A_{azi}$ and the annular electrode $M_1$. In addition, the potential difference between the annular electrode $M_1$ and the annular electrode $M_2$ is written $\Delta V_M$. The voltages $\Delta V_{azi}$ and $\Delta V_M$ are measured directly. It is also possible to measure signals representative of these voltages.

On the basis of information concerning the voltages $\Delta V_{azi}$ and $\Delta V_M$, it is possible to deduce the ratio $\Delta V_{azi}/\Delta V_M$ which, for each azimuth direction around the sonde, as defined by the position of the corresponding azimuth electrode $A_{azi}$, is a function of the distance between said azimuth electrode $A_{azi}$ and the zone of the wall of the borehole situated facing said azimuth electrode $A_{azi}$. The measurement can be performed for each of the azimuth electrodes $A_{azi}$ ($1 \leq i \leq N$) or for a fraction only of the N azimuth electrodes.

This method requires only a single current $I_o$ to be emitted from an annular electrode $A_0$. It thus makes no use of current injection on the azimuth electrodes, unlike the prior art apparatus. Also, the above-described method makes use of voltage measurements only, thereby avoiding any need to measure voltages and currents simultaneously. Finally, the result obtained is independent of the resistivity of the drilling mud $R_M$.

In this method, the total current $I_t$ emitted into the surrounding formation is equal to zero. The emitted current $I_0$ flows essentially through the drilling mud, i.e. in a zone situated between the outside surface of the sonde 22 and the wall of the borehole 10. The current $I_0$ is an alternating current, e.g. at a frequency equal to 162 Hz.

The distance di measured in a direction i defined by an azimuth electrode $A_{azi}$ is given by:

$$d_i = \frac{K_1 \times \Delta V_{azi}}{\Delta V_M}$$

where the coefficient $k_1$ is a coefficient which depends on the shape of the sonde and which is thus fixed for a given sonde.

On the basis of information concerning the distances $d_i$, it is possible to deduce information concerning the eccentricity of the sonde in the borehole and on the more or less irregular nature of the section of said hole. For example, for each direction i, it is possible to define an eccentricity signal $C_i$ using the following formula (for even N):

$$C_i = -(d_i - d_{i+N/2}) \text{ if } i \leq N$$

$$C_i = -(d_i - d_{i-N/2}) \text{ if } i > N$$

Figure 4:
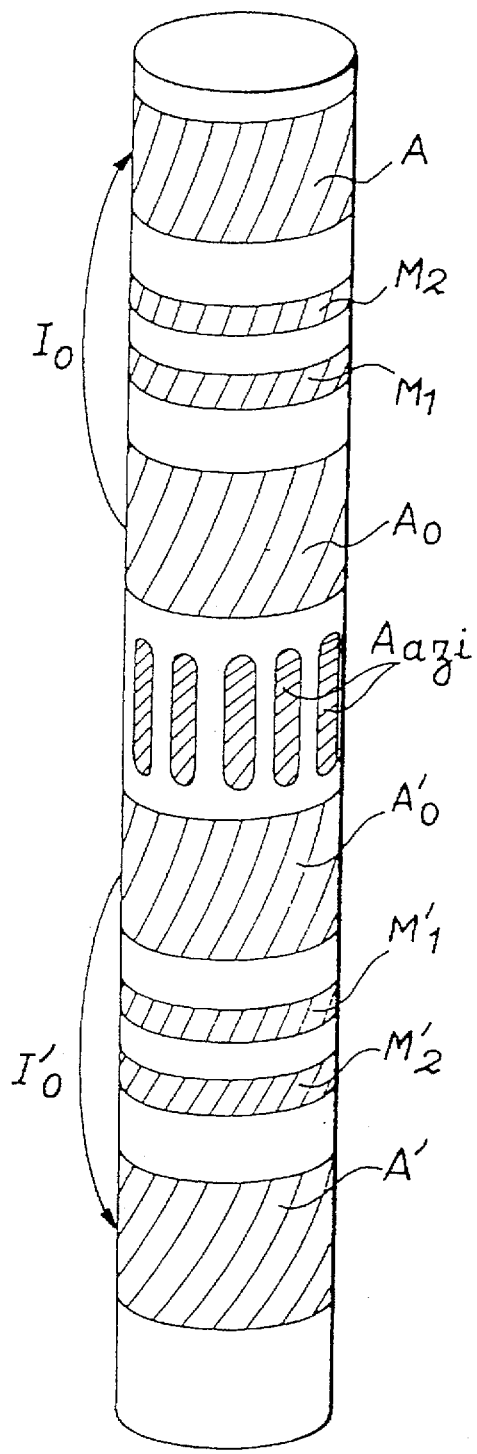
FIG. 4 shows another embodiment of apparatus of the invention.

Another embodiment of apparatus for implementing a method of the invention is shown in FIG. 4.

In this figure, azimuth electrodes are still referenced $A_{azi}$. The structure located above the azimuth electrodes $A_{azi}$ in this figure is identical to the structure described above with reference to FIG. 3. Towards the other end of the sonde relative to the azimuth electrodes, there is an annular electrode structure comprising an annular current electrode $A_0'$ and an annular current return electrode $A'$. A current $I_0'$ is emitted from the annular electrode $A_0'$. $I_0$ is thus injected by $A_0$ and $I_0'$ by $A_0'$, with said currents returning respectively via A and A'. $A_0$ and $A_0'$ are short-circuited together as are A and A', so a current is thus injected between the two pairs of electrodes. Annular potential-measurement electrodes $M_1'$ and $M_2'$ may likewise be provided. For each azimuth electrode $A_{azi}$, a potential difference $\Delta V'_{azi}$ can be measured between said azimuth electrode and the electrode $M_1'$, whereas a potential difference $\Delta V_m'$ is measured between the annular electrodes $M_1'$ and $M_2'$. In theory, the two measurements performed using $I_0$ and $I_0'$ should lead to the same values for the geometrical characteristics of the borehole. If the measured values of the potentials for the two arrays of electrodes are not identical, it is then possible for each direction i to deduce a mean value of $\Delta V_{azi}$ and $\Delta V'_{azi}$ and also a mean value of $\Delta V_m$ and $\Delta V_m'$, and to take the ratio of the two means in order to obtain information concerning $d_i$. Such a difference between the values of the potentials from the two electrodes arrays makes it possible to conclude that there is local variation in the shape of the hole.

In a variant, it is possible to position one of the annular potential-measurement electrodes $M_1$ or $M_2$ within the annular current electrode $A_0$. A portion of the electrode $A_0$ then extends above the corresponding potential-measurement electrode and a portion of the electrode $A_0$ extends below the same potential-measurement electrode. The same technique can be applied to the electrode $A_0'$ and to one of the electrodes $M_1'$ and $M_2'$ in the configuration of FIG. 4. This embodiment makes it possible to further improve measurement when there exists variations in contact impedance at the surface of the electrode $A_0$ or $A_0'$.

Figure 5A:
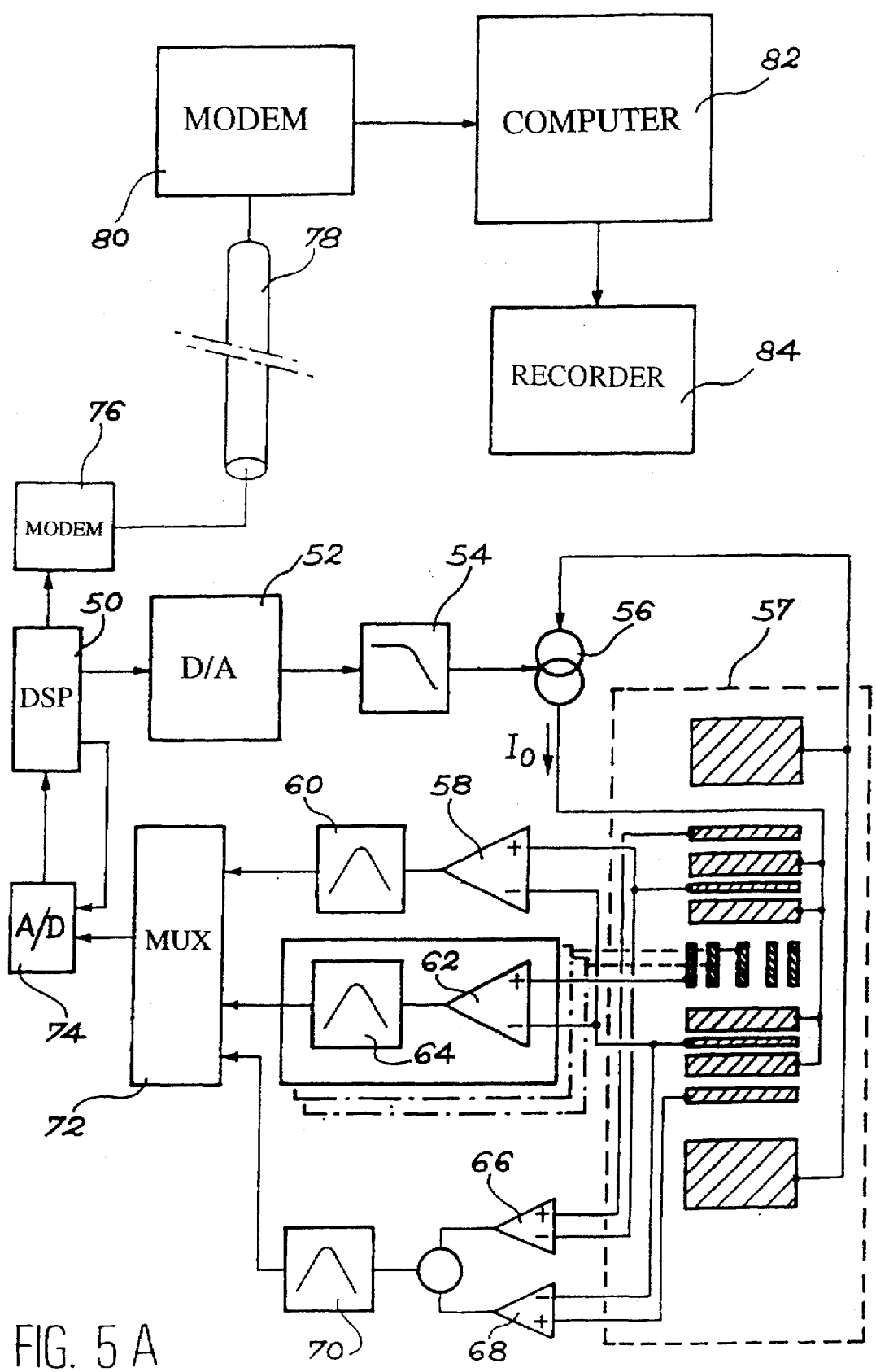
FIGS. 5A and 5B are electrical circuit diagrams for implementing apparatus of the present invention.
Figure 5B:
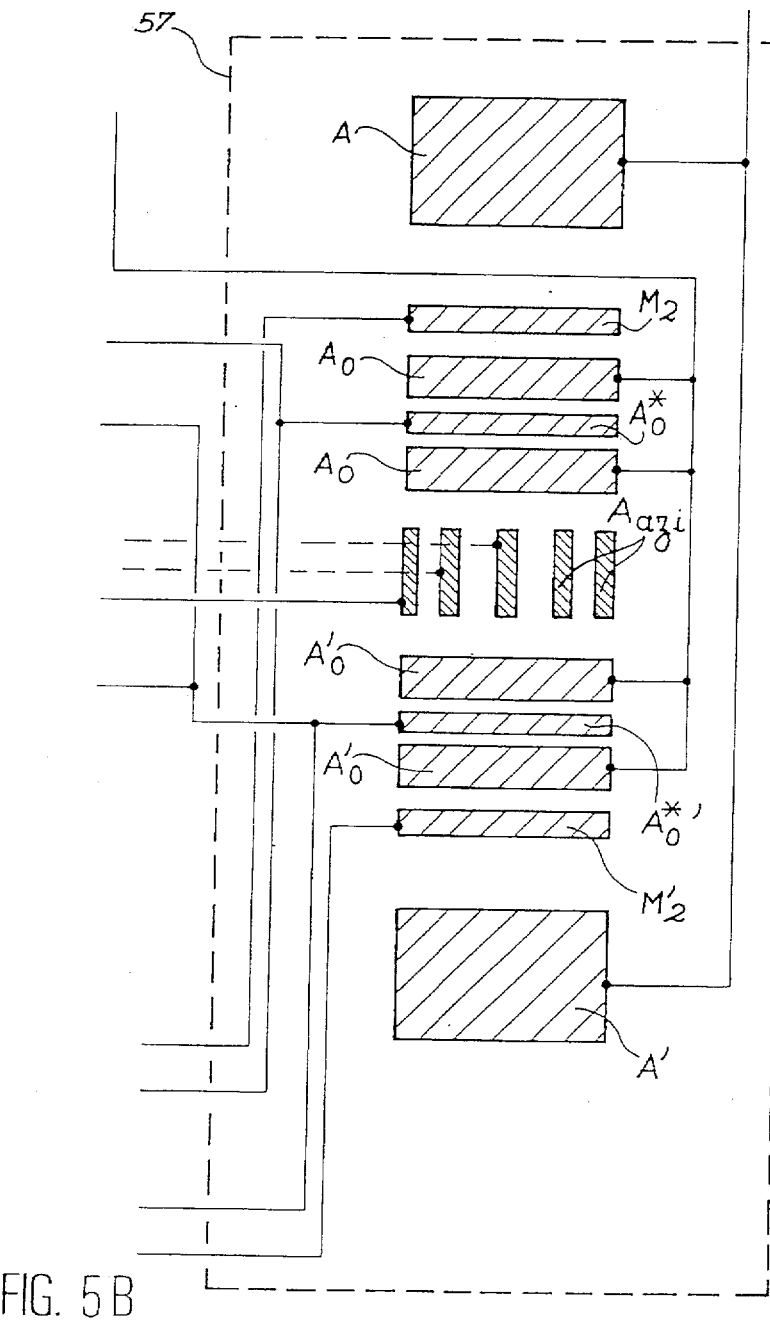

An electrical circuit for operating apparatus of the invention is now described with reference to FIGS. 5A and 5B, FIG. 5B showing the detail of references for elements contained in block 57 of FIG. 5A. In these figures, azimuth electrodes and annular electrodes are shown diagrammatically in a symmetrical configuration about the azimuth electrodes. Each of the current electrodes $A_0$ and $A_0'$ is split into two by a potential-measurement electrode $A_0^*$ and $A_0^{*'}$, as explained above. In these figures, electrodes having the same functions as electrodes in FIG. 4 are designated by the same reference symbols. The currents $I_0$ and $I_0'$ emitted by the electrodes $A_0$ and $A_0'$ are generated by a digital processor 50, a digital-to-analog converter 52, a lowpass filter 54, and a current generator 56. Signals are taken from the measurement electrodes $M_2$, $A_0^*$, $A_0^{*'}$, and $M_2'$ and also from the azimuth electrodes $A_{azi}$. Differential amplifiers 58, 62, 66, and 68 combine these signals in pairs. The outputs of amplifiers 58 and 62 are connected to bandpass filters 60 and 64. There are as many amplifiers 62 and bandpass filters 64 as there are azimuth electrodes $A_{azi}$. The outputs from the amplifiers 66 and 68 are summed and filtered (bandpass filter 70). All of the resulting signals are applied to a multiplexer 72 whose output is connected to an analog-to-digital converter 74 combined with an amplifier having programmable gain. The output from the converter 74 is connected to the digital processor 50, and the signals are then applied to a transmitter 76. All of the above-described elements are generally integrated within the body of the sonde. The sonde is connected via a cable 78 to a receiver 80 which transmits the data to a computer 82 and to a recorder 84. Data display means may also be provided. The computer 82 is a device of conventional type, specially programmed to process the measurements performed by the sonde. It may be integrated in the surface unit 16 of FIG. 2.

The circuit described above with reference to FIGS. 5A and 5B is easily transposable to the various electrode dispositions that are already described above.

Figure 6:
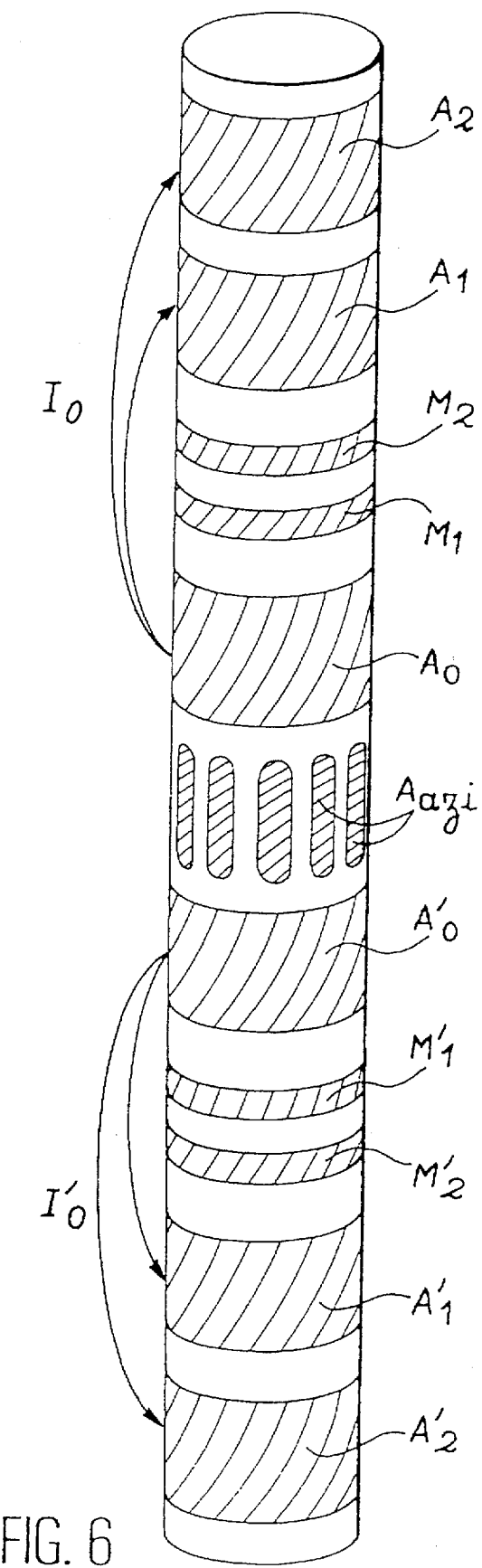
FIG. 6 shows another embodiment of apparatus of the invention.

For reasons of compatibility with other tools that can also be used for other types of measurement, the apparatus of the invention may further include, as shown in FIG. 6, current return electrodes that are split into two portions $A_1$, $A_2$ and $A_1'$ and $A_2'$. In order to perform a measurement in accordance with the method of the invention, the electrodes $A_1$ and $A_2$ are maintained at the same potential, as are the electrodes $A_1'$ and $A_2'$. In this way, the current $I_0$ emitted by the electrode $A_0$ returns via both electrodes $A_1$ and $A_2$. The current $I_0'$ emitted by the electrode $A_0'$ returns via both electrodes $A_1'$ and $A_2'$.

Figure 7:
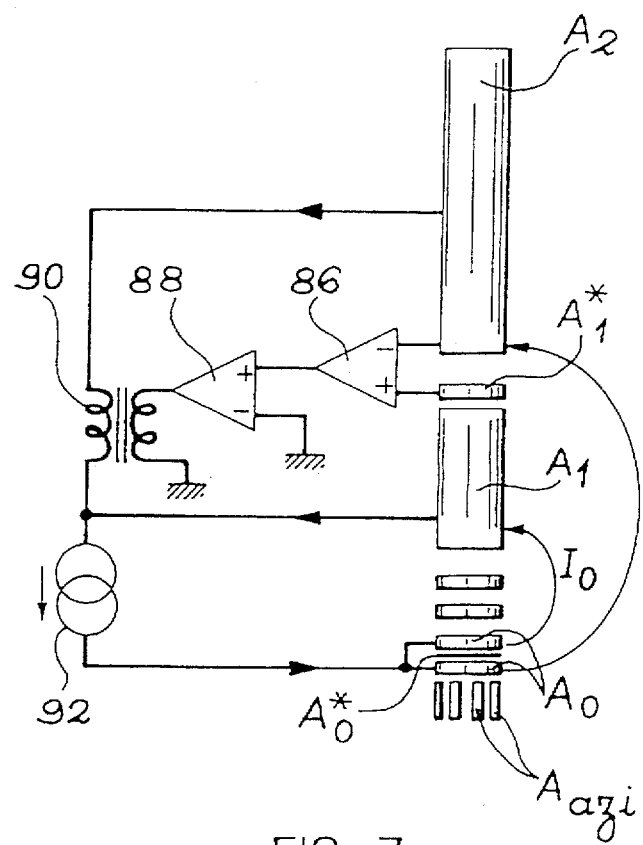
FIG. 7 is an electrical circuit diagram for implementing another apparatus of the invention.

An electrical circuit for apparatus enabling the two electrodes $A_1$ and $A_2$ to be maintained at the same potential is described with reference to FIG. 7.

This figure shows only the top portion of the sonde, above the azimuth electrodes. An electrode $A_1^*$ is associated with the electrode $A_1$ so as to make it possible to measure the potential of $A_1$. An amplifier 86 delivers a signal proportional to the voltage measured between the electrode $A_2$ and the electrode $A_1^*$. A differential amplifier 88 serves to compare the resulting signal with a ground potential. If there is unbalance between the voltages of the electrodes $A_2$ and $A_1^*$, then the amplifier 88 delivers a non-zero signal to a transformer 90 which controls a current generator 92. The current generator then delivers a greater or lesser current to the electrodes $A_0$ depending on the potential difference between the electrodes $A_2$ and $A_1^*$. The delivered current $I_0$ flows essentially through the drilling mud around the sonde and returns to the sonde via the electrodes $A_1$ and $A_2$. The same circuit can be applied to the electrodes $A_1'$ and $A_2'$, with the electrode $A_1'$ being associated with a potential-measurement electrode $A_1^*$. All of the elements 86–92 can be integrated inside the body of the sonde which is lowered down the borehole.

We claim:

1. A method for evaluating the geometrical characteristics of a well (10), the method comprising:

inserting a sonde (12) of elongate shape into the well, the sonde including an array of N azimuth electrodes ($A_{azi}$) disposed around a circumference of the body (17) of the sonde, an annular current electrode ($A_0$) longitudinally separated from the array of azimuth electrodes, and at least one annular current return electrode (A) longitudinally offset from the annular current electrode and from the array of azimuth electrodes, the annular electrodes being towards the same end of the sonde relative to the azimuth electrodes;

emitting a current $I_0$ via the annular current electrode ($A_0$), said current $I_0$ flowing essentially in the column of mud situated inside the well (10) and returning to said at least one annular current return electrode; and detecting signals induced in response to the current $I_0$, from which distances ($d_i$) between the body (17) of the sonde and the wall of the well (10), in one of a plurality of directions around the sonde, can be determined, each direction corresponding to one of said azimuth electrodes in said array.

2. A method according to claim 1, further comprising:

measuring one of said signals as a voltage $\Delta V_{azi}$ between a first annular potential-measurement electrode ($M_1$) and one of the azimuth electrodes for each of said plurality of directions in which the distances between the body (17) of the sonde and the wall of the well (10) are to be measured; and measuring another of said signals as a voltage $\Delta V_M$ between said first annular potential-measurement electrode ($M_1$) and a second annular potential-measurement electrode ($M_2$).

3. A method according to claim 2, in which one of the annular potential-measurement electrodes ($M_1$, $M_2$) lies inside the annular current electrode ($A_0$).

4. A method according to claim 1, in which the sonde includes two annular current return electrodes that are maintained at the same potential.

5. Apparatus for evaluating the geometrical characteristics of a well, the apparatus comprising:

a sonde (12) of elongate shape including an array of N azimuth electrodes ($A_{azi}$) disposed around a circumference of the body (17) of the sonde, an annular current electrode ($A_0$) longitudinally offset from the array of azimuth electrodes, and at least one annular current return electrode (A) longitudinally offset from the annular current electrode and from the array of azimuth electrodes, both annular electrodes lying towards the same end of the sonde relative to the azimuth electrodes;

means for emitting a current $I_0$ via the annular current electrodes ($A_0$) and returning to said at least one annular current return electrode; and means for detecting signals induced in response to the current $I_0$ from which the distances ($d_i$) between the body (17) of the sonde and the wall of the well (10) in a plurality of directions around the sonde, can be determined each direction corresponding to one of said azimuth electrodes in said array.

6. Apparatus according to claim 5, further comprising:

means for measuring one of said signals as a voltage $\Delta V_{azi}$ between a first annular potential-measurement electrode ($M_1$) and one of said azimuth electrodes ($A_{azi}$) for each of said plurality of directions in which distances between the body (17) of the sonde and the wall of the well (10) are to be measured; and means for measuring another of said signals as a voltage $\Delta V_M$ between said first annular potential-measurement electrode ($M_1$) and a second annular potential-measurement electrode ($M_2$).

7. Apparatus according to claim 6, one of the annular potential-measurement electrodes ($M_1$, $M_2$) being inside the first annular current electrode ($A_0$).

8. Apparatus according to claim 5, in which the sonde includes two annular current return electrodes maintained at the same potential.

9. A method of evaluating the geometrical characteristics of a well (10), the method comprising:

inserting a sonde (12) of elongate shape into the well, the sonde including an array of N azimuth electrodes ($A_{azi}$) disposed around a circumference of the body (17) of the sonde, first and second annular current electrodes ($A_0$; $A_0'$) disposed on either side of the array of azimuth electrodes and longitudinally offset from said array, and at least first and second annular current return electrodes (A, $A_1$, $A_2$; A', $A_1'$, $A_2'$) disposed on either side of the array of azimuth electrodes, and longitudinally offset both from said array and from the first and second annular current electrodes ($A_0$; $A_0'$), respectively;

emitting a first current $I_0$ via the first annular current electrode ($A_0$), said current $I_0$ flowing essentially in a column of mud situated inside the well (10) and returning to one of said at least first and second annular current return electrodes;

emitting a second current $I_0'$ via the second annular current electrode ($A_0'$), said current $I_0'$ flowing essentially in a column of mud situated inside the well (10) and returning to another of said at least first and second annular current return electrodes; and detecting signals induced in response to the currents $I_0$ and $I_0'$ from which distances ($d_i$) between the body (17) of the sonde and the wall of the well (10), in a plurality of directions around the sonde, can be determined, each direction corresponding to one of said azimuth electrodes in said array.

10. A method according to claim 9, further including:

measuring one of said signals as a voltage $\Delta V_{azi}$ between a first annular potential-measurement electrode ($M_1$, $A_0^*$) and one of said azimuth electrodes ($A_{azi}$) for each of said plurality of directions in which the distances between the body of the sonde and the wall of the well are to be measured;

measuring another of said signals as a voltage $\Delta V_M$ between said first potential-measurement electrode ($M_1$, $A_0^*$) and a second annular potential-measurement electrode ($M_2$), both these electrodes being situated towards the same end of the sonde relative to the azimuth electrodes;

measuring another of said signals as a voltage $\Delta V_{azi}'$ between a third annular potential-measurement electrode ($M_1'$, $A_0^{*'}$) and one of said azimuth electrodes ($A_{azi}$) for each of said plurality of directions in which the distances between the body of the sonde and the wall of the well are to be measured; and measuring another of said signals as a voltage $\Delta V_M'$ between said third potential-measurement electrode ($M_1'$, $A_0^{*'}$) and a fourth annular potential-measurement electrode ($M_2'$), both these electrodes being situated relative to the azimuth electrodes towards the end of the sonde opposite from the end where the first and second annular potential-measurement electrodes ($M_1$, $A_0^*$, $M_2$) are situated.

11. A method according to claim 9, in which one of the first and second potential-measurement electrodes ($A_0^*$) lies inside the first annular current electrode ($A_0$).

12. A method according to claim 9, in which one of the third and fourth potential-measurement electrodes ($A_0^{*'}$) lies inside the second annular current electrode ($A_0'$).

13. A method according to claim 9, in which the sonde includes two first annular current return electrodes ($A_1$, $A_2$) maintained at the same potential.

14. A method according to claim 9, in which the sonde includes two second annular current return electrodes ($A_1'$, $A_2'$) which are maintained at the same potential.

15. Apparatus for evaluating the geometrical characteristics of a well (10), the apparatus comprising:

a sonde of elongate shape including an array of N azimuth electrodes ($A_{azi}$) disposed around a circumference of the body (17) of the sonde, first and second annular current electrodes ($A_0$, $A_0'$) disposed on either side of the array of azimuth electrodes and longitudinally offset from said array, and at least first and second annular current return electrodes (A, $A_1$, $A_2$; A', $A_1'$, $A_2'$) disposed on either side of the array of azimuth electrodes and longitudinally offset from said array and also from the first and second annular current electrodes ($A_0$, $A_0'$) respectively;

means for emitting a first current $I_0$ via the first annular current electrode ($A_0$) and returning to one of said at least first and second annular current return electrodes;

means for emitting a second current $I_0'$ via the second annular current electrode ($A_0'$) and returning to another of said at least first and second annular current return electrodes; and means for detecting signals induced in response to the currents $I_0$ and $I_0'$ from which distances ($d_i$) between the body (17) of the sonde and the wall of the well (10), in a plurality of directions around the sonde can de determined, each direction corresponding to one of said azimuth electrodes in said array.

16. Apparatus according to claim 15, further including:

means for measuring one of said signals as a voltage $\Delta V_{azi}$ between a first annular potential-measurement electrode ($M_1$, $A_0^*$) and one of said azimuth electrodes ($A_{azi}$);

means for measuring another of said signals as a voltage $\Delta V_M$ between said first potential-measurement electrode ($M_1$, $A_0^*$) and a second annular potential-measurement electrode ($M_2$), both these electrodes being situated towards the same end of the sonde relative to the azimuth electrodes;

means for measuring another of said signals as a voltage $\Delta V_{azi}'$ between a third annular potential-measurement electrode ($M1'$,$AO^*$) and one of said azimuth electrodes ($A_{azi}$); and means for measuring another of said signals as a voltage $\Delta V_M'$ between said third annular potential-measurement electrode ($M_1'$, $A_0^{*'}$) and a fourth annular potential-measurement electrode ($M_2'$), both these electrodes being situated, relative to the azimuth electrodes, towards an end of the sonde opposite from its end where the first and second annular potential-measurement electrodes ($M_1$, $A_0^*$, $M_2$) are situated.

17. Apparatus according to claim 15, in which one of the first and second potential-measurement electrodes ($A_0^*$) lies inside the first annular current electrode ($A_0$).

18. Apparatus according to claim 15, in which one of the third and fourth potential-measurement electrodes ($A_0^{*'}$) lies inside the second annular current electrode ($A_0'$).

19. Apparatus according to claim 15, in which the sonde includes two first annular current return electrodes ($A_1$, $A_2$) which are maintained at the same potential.

* * * * *